United States Patent [19]
Arroyo et al.

[11] 3,730,612
[45] May 1, 1973

[54] BACK-OF-THE-HEAD VIEWING SYSTEM

[76] Inventors: Norma Z. Arroyo, 400 Liberty St., San Francisco, Calif. 94114; Norman T. Seaton, 240 Tunnel Rd., Berkeley, Calif. 94705

[22] Filed: Apr. 19, 1971

[21] Appl. No.: 134,954

[52] U.S. Cl. ................. 350/305, 248/476, 248/480
[51] Int. Cl. ............................................. G02b 5/08
[58] Field of Search ..................... 350/305; 248/476, 248/477, 480–484, 495

[56] References Cited

UNITED STATES PATENTS

| | | | |
|---|---|---|---|
| 3,019,709 | 2/1962 | Teason | 248/477 |
| 763,380 | 6/1904 | Martin | 350/305 |
| 878,098 | 2/1908 | Sutton | 350/305 |
| 1,031,075 | 7/1912 | Lundin | 350/305 |

FOREIGN PATENTS OR APPLICATIONS

| | | | |
|---|---|---|---|
| 617,565 | 11/1926 | France | 350/305 |

*Primary Examiner*—Ronald L. Wibert
*Assistant Examiner*—Michael J. Tokar
*Attorney*—Warren, Rubin, Brucker & Chickering

[57] ABSTRACT

A mirror mounting unit designed to function along side an existing mirror to provide a back-of-the-head viewing system. The unit is composed of a bracket having a vertical bar upon which is slideably and rotatably mounted an extendible arm having on one end thereof one portion of a ball and socket retainer and a hand mirror with handle, having on one end of the handle the other portion of the retainer, such that the mirror may be rotatably suspended thereby.

3 Claims, 11 Drawing Figures

INVENTORS
Norma Z. Arroyo
Norman T. Seaton
BY Warren, Rubin, Brucker & Chickering
Attorneys

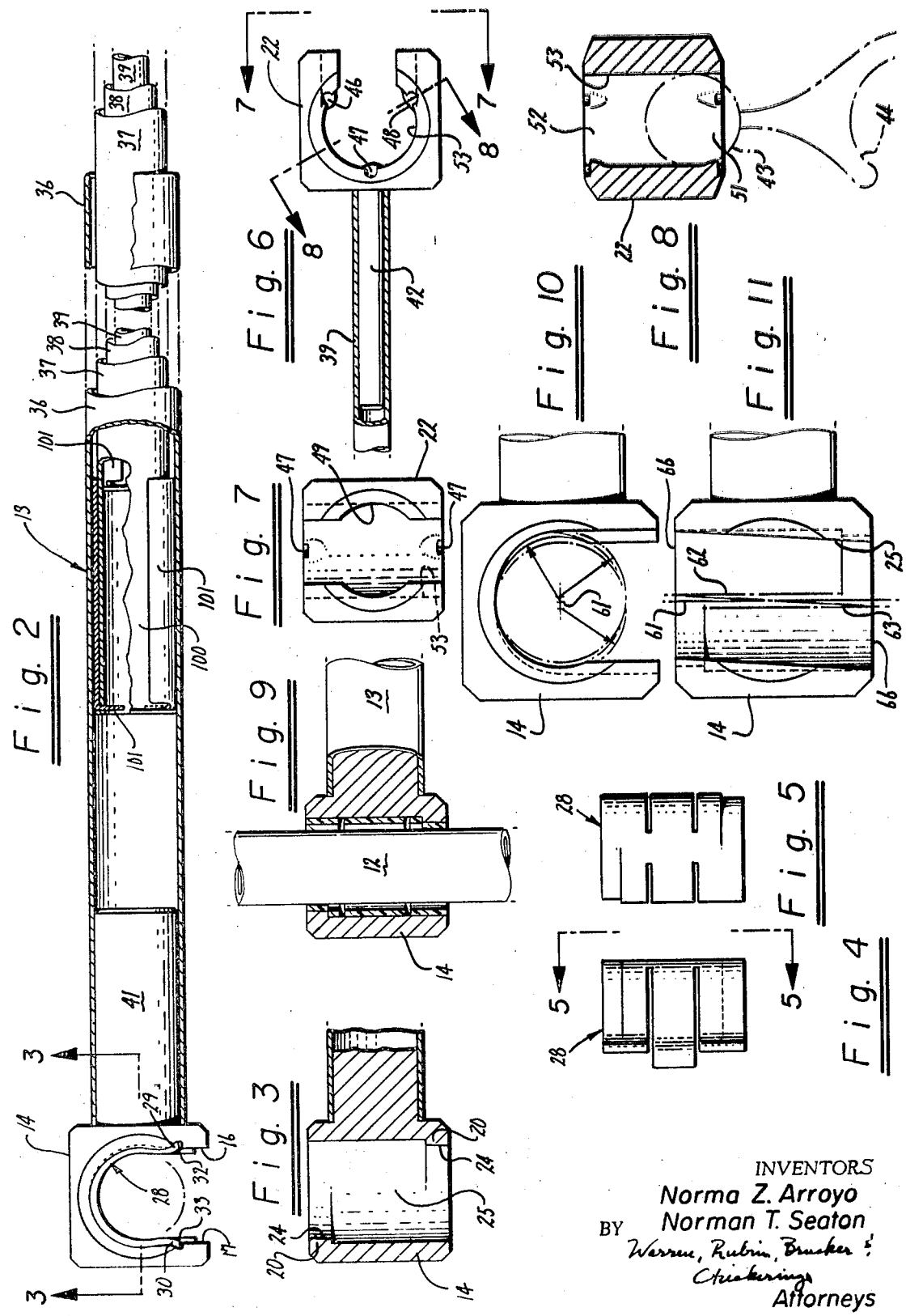

BACK-OF-THE-HEAD VIEWING SYSTEM

The present invention relates to an adjustable mirror assembly, and more particularly, to a unit which is to be used in conjunction with another mirror to permit ease in back-of-the-head viewing.

Mirror assemblies permitting back of-the-head viewing have been proposed in the art over the years. For example, see U.S. Pat. Nos. 763,380, 1,994,126, 2,915,944 and 3,392,950. While all of the devices disclosed in these patents enable one to view the back of the head, no prior art device known to the inventors is able to combine the beneficial aspects to be found herein.

For example, the present device may be distinguished from prior devices in the fact that it may be readily stored in a rather small space when not in use, but in operation it is capable of large adjustments in all three dimensions so as to accommodate the various needs of different users.

It is an object of the present invention to provide a back-of-the-head viewing unit of the character described which is extremely easy to use. This object is met herein by utilizing easily detachable mounting means to both store the parts when not in use and position and secure the parts when in use.

A further object of the present invention is to provide a unit of the character above noted which is able to assume a given position quickly and remain therein without further necessity to secure any parts thereof, until its user desires to change the position.

Still another object of the described invention is to provide a unit which will enable the user, by the use of various types of mirrors therewith, to obtain both plain and magnified views of various portions of the torso.

A further object of the present invention is to permit the movable mirror used therein to be quickly and easily detachable so as to be further separately utilized as a regular hand mirror if so desired.

Another object of the present invention is to provide an esthetically pleasing device of the character above which lends itself to inexpensive mass production.

The invention possesses other objects and features of advantage, some of which of the foregoing will be set forth in the following description of the preferred form of the invention which is illustrated in the drawings accompanying and forming a part of this specification. It is to be understood, however, that variations in the showing made by the said drawings and description may be adopted within the scope of the invention as set forth in the claims.

Referring to said drawings:

FIG. 2 is a partially cut-away view of the extendible arm of the device together with the mounting means thereof.

FIG. 3 is a cross-sectional view of the mounting means taken substantially along the plane of line 3—3 of FIG. 2.

FIG. 4 is a plan view of the spring leaf carried by the mounting means.

FIG. 5 is a top plan view of the spring leaf taken substantially along the planes of line 5—5 of FIG. 4.

FIG. 6 is a partially cut-away view of a section of the extendible arm together with the spherical socket.

FIG. 7 is a plan view of the socket taken substantially along line 7—7 of FIG. 6.

FIG. 8 is a cross-sectional view of the socket taken substantially along the line 8—8 of FIG. 6 and showing (in phantom) the positioning of the ball therein.

FIG. 9 is a fragmentary view partially in cross section of the mounting means shown mounted on a rod.

FIG. 10 is a top plan view of the mounting means.

FIG. 11 is a side plan view of the mounting means.

Figure 1:
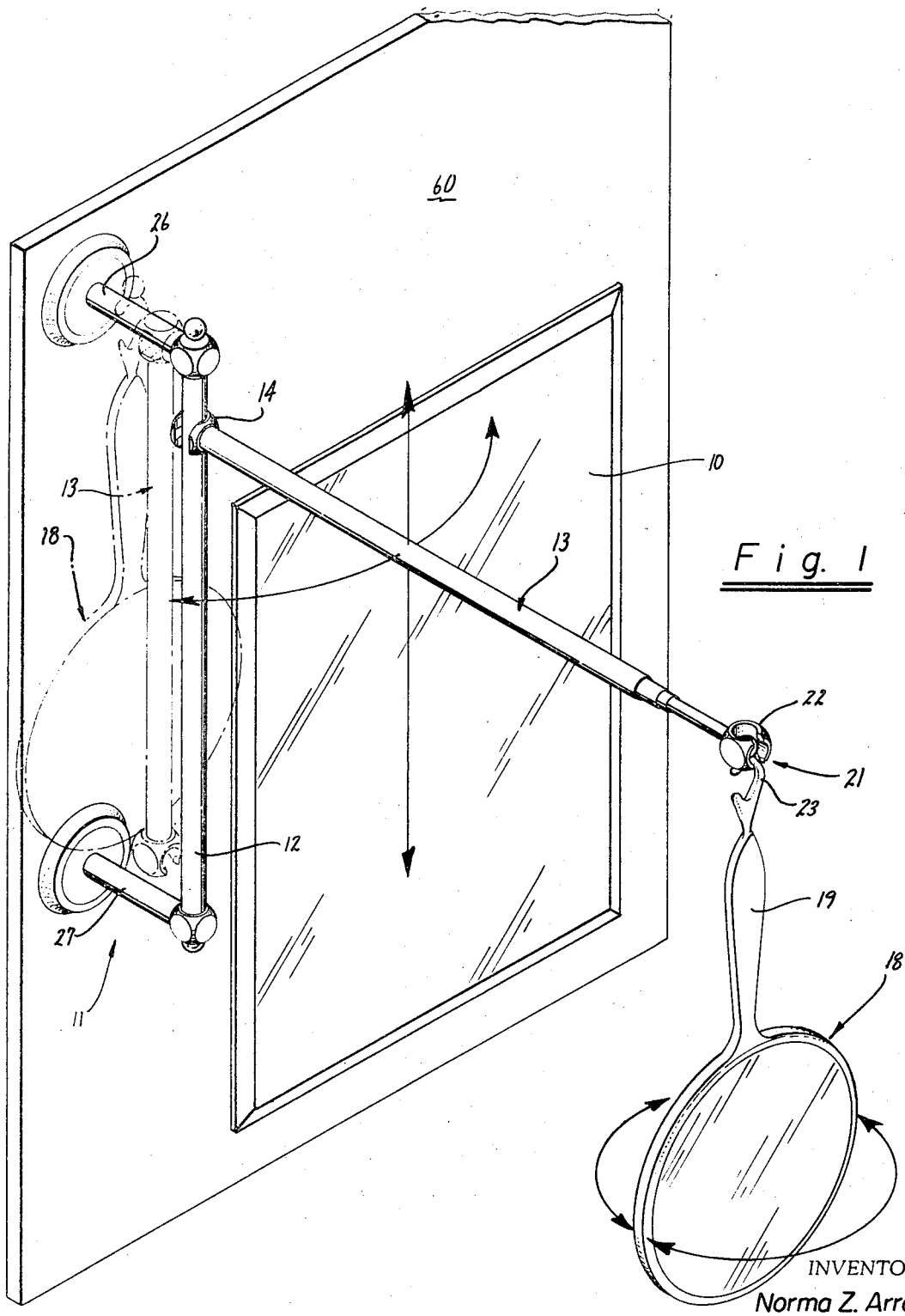
FIG. 1 is a perspective view of the mirror mounting unit mounted adjacent a substantially vertical surface mirror and constructed in accordance with the present invention and illustrated both in its in-use position and in a storage position (phantom lines).

The preferred embodiment of the mirror mounting unit of the present invention consists briefly of a fixed mirror 10 mounted on a substantially vertical surface (not shown) such as a wall or door; a bracket 11 adapted for mounting on the surface adjacent the fixed mirror and having a substantially vertically disposed mounting rod 12; an extendable arm 13; a snapable mount 14 formed with open jaws 16 and 17 (see FIG. 2) dimensioned to demountably receive and slideably embrace vertical rod 12 for adjustable vertical positioning thereon and for rotation about said rod; a hand mirror 18 having a handle 19; and universal mounting means 21 having demountably attached sections, one (23) carried by the handle 19 and the other (22) carried by the arm 13 for suspending the hand mirror from the arm and for rotation about a vertical axis.

As an important feature of the present invention, the bracket 11 is provided with horizontally disposed mounting rods 26, 27, and the jaws 16, 17 of the mounting means section carried by the arm are formed and dimensioned for demountable attachment to the horizontal rods for suspension of the arm and hand mirror therefrom when not in use. Hooking part 23 is designed for similar attachment of the hand mirror when not in use. Thus the entire unit may be readily contained within the space bounded by the bracket and vertical surface during storage periods as shown in FIG. 1. Additionally, the mirror 18 and/or arm 13 may be conveniently hung upon either of the upper or lower rods 26 or 27. In the preferred embodiment, both the vertical and horizontal rods are cylindrical and of substantially the same diameter so as to permit secure, interchangeable mounting thereon of the jaws.

In its essential form, the mount 14 grips the vertical rod 12 by means of friction that depends on the moment generated by the weight of the telescopic rod 13 and the weight of any object attached at the end 22. Reliable gripping action, yet with free-sliding operation, is obtained when mount 14 is fabricated such that the passage for the rod 12 consists of a semi-cylindrical hole to which has been added diametrically opposed offset clearances 20, passing nearly through mount 14 from the opposite ends of the hole such as to leave the friction gripping edges 24. Mount fabrication entails milling a hole, having center line 61 and a diameter equal to that of the rod 12, all the way through a block, preferably one of aluminum. In the preferred embodiment the hole and rod have a diameter of seven-sixteenth inch. Thereafter another 7/16 inch hole, having center line 62 is milled down to approximately the bottom of the block. In the preferred embodiment, the depth of material left uncut is 0.070 inch. A similar hole having center line 63 is then milled out starting from the bottom side of the block. Preferably, for each hole, the offset from initial center line 61 is the same, being approximately 0.020 inch for the device noted here. Finally a lateral cut of rod diameter is made in from a side of the block such that each edge is tangent to the respective offset hole opening at the opposite ends 65 and 66. Easy admission of the vertical rod 12 to the gripping action of mount 14 is obtained by an appropriate oblique lateral cutout 25 in the mount, which acts together with the offset clearances 20, to permit the rod to rest in essentially a horizontal position, when hung such that the cutout and gripping edges are positioned to offset the effect each tends to produce.

The jaws contain a spring leaf 28 which is formed and mounted therein to provide snap action positioning of the jaws on the various rods. The leaf is made of a material which is capable of being made thin (approximately 0.008–0.032 inch) and flexible and yet durable. For this purpose, both brass and plastic have been found to be suitable. The leaf is preferably cut into several sections as shown in FIG. 3, 4 and 5 and formed with tongue portions 29, 30 which slideably seat in jaw grooves 32 and 33.

In the preferred construction of the unit the extendible arm is comprised of four sections 36, 37, 38 and 39 each approximately 10 inches long, outer section 36 having an exterior diameter of approximately three-eighth inches. The two ends of the arm have press fitted therein dowels 41 and 42 forming a part of the mounting means and universal mounting means respectively. Each section is capable of rotation about the arm axis.

The telescopic sections 37, 38, 39 are a modification of a type known in the art but herein one end 100 of the telescoping or extendable rod is spun down to make a close fit on the next smaller tube, and in which the other, opposite end is fitted with two friction stop springs 101 keyed into circumferential slots in said end. The modification here employed is that this latter friction stop end is spun out to fit closely the next larger size tube, and thereby minimize in the extended state the angle between the axes of successive tubes.

The preferred construction of the unit includes a spherical socket as part of the universal mounting means mounted upon the arm and the handle mounted section thereof comprising a ball 43 dimensioned for mounting in the socket and an adjacent hook 44 formed and dimensioned to demountably engage the horizontal rods.

Socket 22 is novelly designed and formed so that three retaining points 46, 47 and 48 support the ball substantially near an imaginary plane which includes the center of the ball and is parallel to the plane formed by the three points. This manner of support permits the suspended mirror to quickly achieve a stable, non-oscillating position upon being moved into use position and to retain this position without further motion for an indefinite period. The socket is further formed with a central opening 49 of larger dimension than the diameter of ball 42, and two retainer portions 51 and 52 each containing a set of the three retaining points above mentioned. This construction facilitates the placement of the ball in the socket. The interior portion 53 of the socket is cylindrical form having a diameter slightly larger than that of ball 43.

In operation, the mirror unit may be stored in a variety of ways, including the manner shown in FIG. 1, wherein both the hand mirror 18 and the extendible rod 13 are draped from the upper arm 26. As an alternative, for mirrors that are incapable of fitting in the space between arms 26 and 27, the mirror may be hung from lower arm 27, in the same fashion it is depicted as depending on arm 26. Of course, other combinations, such as hanging both the mirror and rod 13 from the lower arm 27, are possible.

The rod 13 is demounted from the arm 26 or 27 upon which it may be hanging and is snappingly mounted upon mounting rod 12, preferably toward the top portion thereof as depicted in FIG. 1. Thereafter, the hand mirror 18 is removed from its storage position and placed in socket 21. The rod 13 and mirror 18 may then be universally rotated to suit the user's particular dimensions and desires and may also be raised or lowered along the mounting rod 12 as demanded, by simply sliding the mounting 14 therealong. Additionally, the hand mirror may be rotated in mounting means 21 and due to the above-noted construction, the entire unit will remain extremely stationary almost immediately upon the completion of the various adjustments the user desires to complete.

After usage, the unit may be disassembled, in the reverse order noted above and placed in the storage position. Additionally, the hand mirror may be separately utilized for various other uses which do not call for the assistance of a second mirror.

In another embodiment, shown in FIG. 1, the back-of-the-head viewing system has the fixed mirror 10 mounted on a substantially vertical surface such as mounting board 60 and bracket 11 is mounted adjacent the surface of the fixed mirror. The invention is otherwise as described above, but may additionally be readily removed from one location to another without having to remove the fixed mirror and bracket from a vertical surface. Additional attaching or mounting means (not shown) may be provided on board or surface 60 for supporting the board in a substantially vertical plane if desired. Thus the board may be permanently affixed in place or may be so situated as to be readily moved into various locations as usage demands and temporarily secured in position thereat.

We claim:

1. In a back-of-the-head viewing system having a first mirror, means supporting said first mirror in a substantially vertical plane, a bracket positioned adjacent said first mirror and including an upper substantially horizontally disposed support rod and a substantially vertically disposed mounting rod, an extensible arm, arm mounting means secured adjacent a first end of said arm and slidably mounting said arm on said mounting rod, a second mirror, and universal mounting means demountably attaching said second mirror to said arm adjacent a second end thereof, the improvement comprising:

said arm mounting means being formed as a sleeve-like element secured to said arm and formed with a pair of opposed jaws oriented on planes generally perpendicularly to said arm and extending vertically over the length of said element to define a vertically extending opening in a side of said element, said opening being dimensioned for slidable mounting and removal of said arm from said mounting rod and remounting of said arm on said support rod for storage thereof, said jaws further being formed to grippingly engage said mounting rod at vertically spaced points on opposite sides thereof upon rotation of said element about a horizontal axis under the weight of said arm and formed to be released from said mounting rod upon unweighting of said arm for selected vertical adjustment and automatic gravity actuated gripping of said mounting rod at any vertical height on said mounting rod, and said jaws being formed for rotation of said arm about said mounting rod while maintaining gripping engagement with said mounting rod; and said second mirror being provided with handle means and formed for selective removal from said arm for use separately of said system, said handle means being formed with support rod engaging means for mounting on said support rod for storage.

2. A back-of-the-head viewing system as defined in claim 1 wherein, said arm mounting means is provided with spring biasing means carried by said jaws, said spring biasing means being formed with a resiliently movable portion retaining said element and said arm on said mounting rod and said support rod against inadvertent demounting therefrom, said movable portion being formed for selective resilient displacement to mount and demount said arm from said mounting rod and said support rod to provide a snap mount thereto.

3. A back-of-the-head viewing system as defined in claim 1 wherein, said universal mounting means is provided by a ball element mounted on said handle means of said second mirror and a socket mounted on said arm having a ball receiving opening, a side channel, a downwardly facing opening, and three retaining elements dimensioned to prevent passage of said ball element downwardly therepast and dimensioned to engage and support said ball element at a plane adjacent to, below and substantially parallel to a horizontal plane passing through the center of said ball element to frictionally damp relative movement of said arm and said second mirror by wedging action between said retaining elements and ball element whereby said second mirror is mounted in said socket for selective movement therein and is frictionally damped to a stable position by gravity.

* * * * *